April 25, 1933.   A. F. W. HAEUSSLER   1,905,934
APPARATUS FOR SIGNALING
Filed April 18, 1929
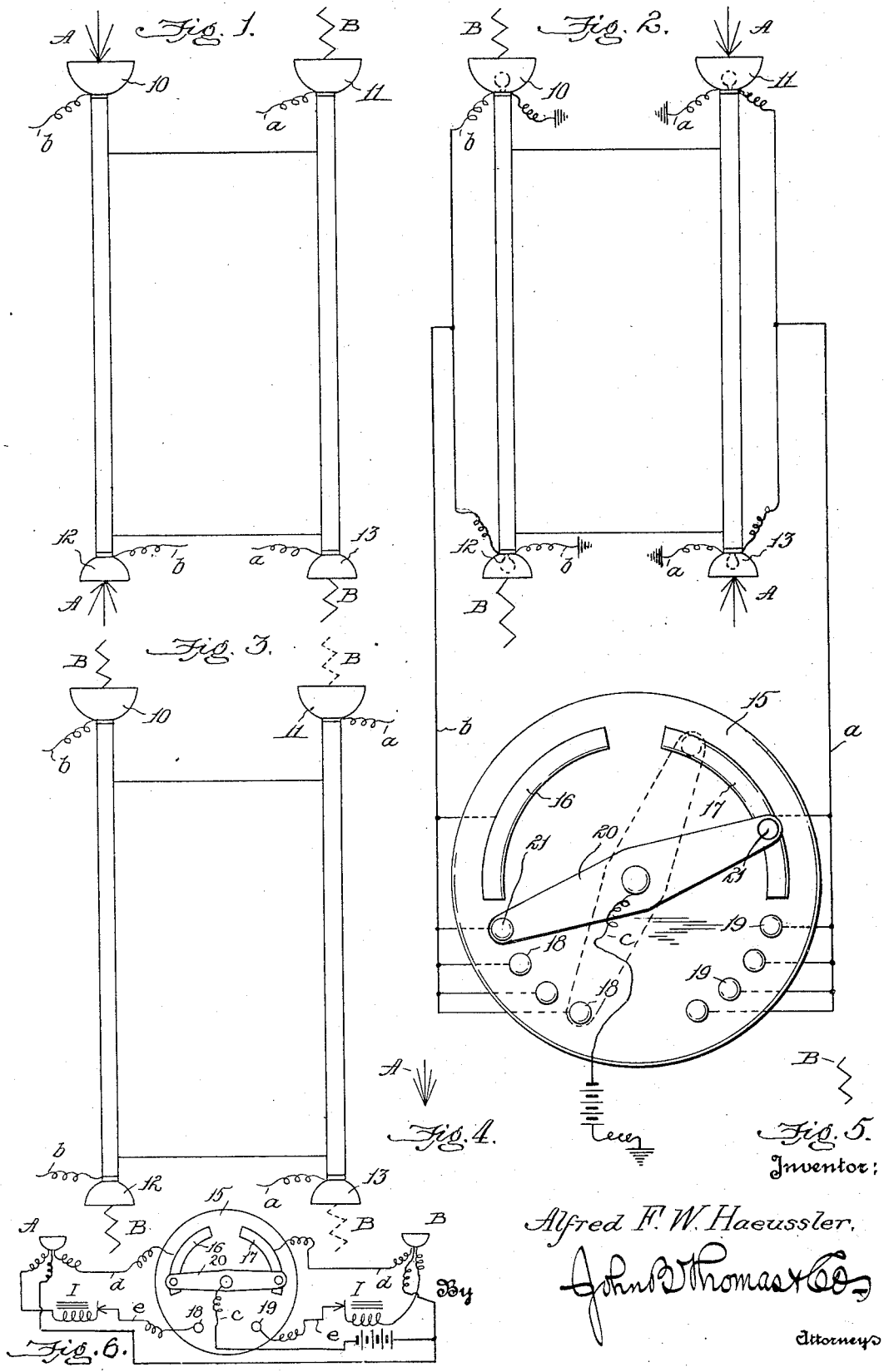

Patented Apr. 25, 1933

1,905,934

UNITED STATES PATENT OFFICE

ALFRED F. W. HAEUSSLER, OF SAN JUAN, PUERTO RICO

APPARATUS FOR SIGNALING

Application filed April 18, 1929. Serial No. 356,216.

My invention is an improved apparatus for signaling for motor vehicles by which the driver may quickly and accurately indicate to traffic in front and rear the direction said vehicle is to be driven—the intention of the driver to make a turn in either direction or to stop being indicated in the present instance by a simple and reliable signaling system employing electric lights at each side of the front and rear of the vehicle in connection with means for controlling said lights separately by the will of the driver.

In the preferred embodiment of my improved system of direction signaling for motor vehicles the electric lights constituting the signaling devices are in separate circuits controlled by a suitable switch so that the driver can cause the electric lights to be turned off and on in quick succession or flicker according to a prearranged system of signaling, for instance those on the right-hand side of the vehicle operate to flicker when a turn is to be made to the right and those on the left-hand side for a turn to the left, while the signal for slowing up or stopping may be indicated by flickering the lights on both sides of the vehicle alternately.

The main object of my invention therefore is to provide a system of direction signaling for motor vehicles in which the operation of lights at each side of the vehicle will give the required signal at front and rear as to the intended operation of the car on the roadway, and although in carrying out the system I prefer to employ an arrangement providing flickering lights the latter may be operated to project lights otherwise distinguished from the lights and signals ordinarily used on vehicles.

In the accompanying drawing I have illustrated several diagrammatic views to more clearly explain the operation of my improved direction signaling system.

Figure 1 is a view showing the operation of the lights in turning to the right.

Fig. 2 is a similar view for turning to the left, including the preferred form of switch and electric connections.

Fig. 3 illustrates the operation of the signals to indicate slowing up or stopping of the vehicle.

Fig. 4 indicates a steady light,

Fig. 5 indicates a flickering light, and

Fig. 6 is a diagrammatic view including a modified form of switch.

In carrying out my invention electric lights or lamps 10 and 11 are mounted at opposite sides of the front of the car to throw the rays forwardly, and electric lights or lamps 12 and 13 mounted at opposite sides of the rear end of the vehicle as for instance on the rear fenders, the lights 10 and 12 at the front of the car being the usual headlights. The electric lamps may be of ordinary plain white lights, clear lights, or a combination of lights for differentiating them one from another in signaling.

In the preferred embodiment of my invention the electric lights or lamps each will show a plain white light and to change their characteristics individually and collectively they are in separate circuits connected to a switch such as illustrated in Fig. 2 whereby the lights at one side of the vehicle will be caused to flicker for signaling and those at the other side remain steady, or those at opposite sides of the vehicle caused to flicker alternately for a different signal, as hereinafter more fully explained, the steady lights in the diagrams being indicated by the letter "A" and the flickering lights by "B".

For producing a signal light from the lamps in the nature of successive flashes after the manner of a flickering light I provide a switch such as illustrated in Fig. 2 consisting of a circular insulated base-plate 15 having curved contact-plates 16—17 in the arc of a circle and slightly spaced apart in connection with two series of spaced apart contact-points 18—19 in the same arc of the circle as said contact-plates, the cross-piece or switch-lever 20 being pivoted axially to sweep from diametrically opposite contacts respectively for controlling the circuits to the lamps. Plate 17 and contacts 19 are connected by wires $a$ to the lamps 11—13 at one side of the vehicle, for instance the right-hand side as shown in the diagrammatic views of the drawing, while plate 16 and points 18 are connected by wires $b$ to the lights 10—12 at the other or left-hand side of the vehicle, the switch lever being in circuit with the source of electric current by wire $c$ connected to the pivot thereof and is provided with handles or knobs 21 at opposite ends for operating the same. As will be obvious in the normal position of the switch lever the lights at the front and rear of the vehicle on both sides thereof project steady lights by reason of the fact that the ends of said switch lever are in contact with both plates 16—17, and when it is to signal a turn to the right the switch lever is turned clock-wise so that one end thereof will leave plate 17 and travel over the points 19 to make and break the circuit to the lamps at the right of the vehicle for flickering the same, while the other end of the switch lever will travel over the plate 16 to maintain steady lights at the left-hand side of the vehicle, the lights at the left-hand side of the vehicle being caused to flicker with steady lights maintained at the right-hand side by counter clockwise movement of the switch lever, and by swinging either end of the lever back and forth over the switch-points 18 and 19 the lights at opposite sides of the vehicle will be flickered alternately.

Although the electric switch shown in Fig. 2, and hereinbefore described, is the preferred form to be used in connection with the signaling system it is obvious that any other form may be employed, as for instance as indicated in the diagrammatic view Fig. 6, in which wires $d\ d$ from the segmental contact pieces 16 and 17 lead directly to the lamps A and B respectively, while wires $e\ e$ lead from single contact points 18 and 19 to the aforesaid lamps with an interposed current interrupter or buzzer I for causing flickering of the lights A or B according to the rotation of the switch lever 20, in this instance of course the driver not being required to vibrate the switch lever but simply turn said switch lever into contact with either contact point 18 or 19.

From the foregoing description the operation of my improved system of signaling will be readily understood, for in the example of operation explained traffic in front and rear of the vehicle will be advised as to the intention of the driver to proceed on a direct course or turn, in the first instance the lights being maintained steady by normal position of the switch lever, and in the latter instance those at one side or the other of the vehicle being caused to flicker by manipulation of the switch lever according to direction the vehicle is to be turned.

I claim:

A signaling system for motor vehicles comprising electric lamps at the front and rear of each side of the vehicle directing the lights to the front and to the rear thereof, a source of electric current, and a switch consisting of a centrally pivoted lever, arcuate contact plates extending from the ends of the lever towards each other at one side of the lever in the normal position of said lever, and contact points spaced from the ends of the contact plates on a line concentric therewith at the other side of the lever in its normal position, said contact plates and companion contact points being electrically connected respectively to the lamps at opposite sides of the vehicle and a circuit connecting the source of current with the aforesaid lever, whereby when the switch lever is thrown in either direction one end thereof will travel over one of the contact plates to furnish a steady light in the lamps at one side of the vehicle and the other end of said lever traveling over the contact points associated with the other contact plate will flash the lamps at the other side of the vehicle and movement of the lever back and forth over the opposite contact plates and points will alternately light and flash the lamps at both sides of the vehicle.

ALFRED F. W. HAEUSSLER.